(12) United States Patent
Nguyen et al.

(10) Patent No.: US 10,067,802 B2
(45) Date of Patent: Sep. 4, 2018

(54) HYBRID SECURITY BATCH PROCESSING IN A CLOUD ENVIRONMENT

(71) Applicant: Red Hat, Inc., Raleigh, NC (US)

(72) Inventors: Filip Nguyen, Brno (CZ); Filip Elias, Vysni Lhoty (CZ)

(73) Assignee: RED HAT, INC., Raleigh, NC (US)

( * ) Notice: Subject to any disclaimer, the term of this patent is extended or adjusted under 35 U.S.C. 154(b) by 282 days.

(21) Appl. No.: 14/790,971

(22) Filed: Jul. 2, 2015

(65) Prior Publication Data

US 2017/0005991 A1 Jan. 5, 2017

(51) Int. Cl.
| | |
|---|---|
| *H04L 9/32* | (2006.01) |
| *G06F 9/50* | (2006.01) |
| *G06F 21/53* | (2013.01) |
| *H04L 29/06* | (2006.01) |
| *H04L 29/08* | (2006.01) |
| *H04L 9/08* | (2006.01) |

(52) U.S. Cl.
CPC ............ *G06F 9/5066* (2013.01); *G06F 21/53* (2013.01); *H04L 63/0442* (2013.01); *H04L 67/1014* (2013.01); *H04L 9/08* (2013.01)

(58) Field of Classification Search
CPC ........ H04L 9/08; H04L 9/0844; H04L 63/061
See application file for complete search history.

(56) References Cited

U.S. PATENT DOCUMENTS

| | | | |
|---|---|---|---|
| 8,429,659 B2 | 4/2013 | Bartfai-Walcott et al. | |
| 8,495,611 B2 | 7/2013 | McCarthy et al. | |
| 9,015,324 B2 | 4/2015 | Jackson | |
| 2006/0015873 A1* | 1/2006 | Dettinger | G06F 9/5038 718/102 |
| 2008/0250246 A1* | 10/2008 | Arditti | H04L 9/3263 713/173 |
| 2010/0131955 A1* | 5/2010 | Brent | G06F 9/4843 718/103 |
| 2011/0270968 A1 | 11/2011 | Salsburg et al. | |
| 2012/0265578 A1* | 10/2012 | Olding | G06Q 10/06 705/7.25 |
| 2014/0095878 A1* | 4/2014 | Shimano | H04L 9/0825 713/171 |
| 2014/0101102 A1 | 4/2014 | Baumgarten et al. | |

(Continued)

OTHER PUBLICATIONS

Vaibhav Khadilkar, Kerim Yasin Oktay, Murat Kantarcioglu, Sharad Mehrotra, "Secure Data Processing Over Hybrid Clouds," 2012, 9 pages, The University of Texas at Dallas; University of California, Irvine; retrieved from http://sites.computer.org/debull/A12dec/hybrid.pdf on Jul. 9, 2015.

(Continued)

*Primary Examiner* — Hadi S Armouche
*Assistant Examiner* — Shaqueal D Wade
(74) *Attorney, Agent, or Firm* — Haynes and Boone, LLP; Thuc Nguyen; Andrew Ehmke (57) ABSTRACT

An example method for processing a batch job that includes a plurality of sequentially ordered tasks includes obtaining a message that includes inputs of a plurality of tasks included in a batch job. The plurality of tasks includes a first task that is sequentially ordered before a second task. The method also includes assigning tasks of the plurality of tasks to different computing nodes. The first task is assigned to a first computing node associated with a first public key, and the second task is assigned to a second computing node associated with a second public key.

20 Claims, 8 Drawing Sheets

(56) References Cited

U.S. PATENT DOCUMENTS

| | | | |
|---|---|---|---|
| 2014/0280142 A1 | 9/2014 | Wasson et al. | |
| 2014/0281500 A1* | 9/2014 | Ignatchenko | H04L 9/3263 713/156 |
| 2014/0351818 A1* | 11/2014 | Katz | G06Q 10/0633 718/102 |
| 2015/0019301 A1 | 1/2015 | Jung et al. | |
| 2015/0089034 A1 | 3/2015 | Stickle et al. | |
| 2016/0004565 A1* | 1/2016 | Harper | G06F 9/4881 718/102 |

OTHER PUBLICATIONS

Kerim Yasin Oktay, Vaibhav Khadilkar, Bijit Hore, Murat Kantarcioglu, Sharad Mehrotra, Bhavani Thuraisingham; "Risk-Aware Workload Distribution in Hybrid Clouds,"; 2012, 8 pages, The University of California, Irvine; The University of Texas at Dallas; retrieved from http://cs.utdallas.edu/secure-cloud-repository/Secure-Hybrid-Clouds/ieee-cloud-2012-paper.pdf on Jul. 9, 2015.

Vaibhav Khadilkar, Kerim Yasin Oktay, Murat Kantarcioglu, Sharad Mehrotra, Bhavani Thuraisingham, "Hybridizer: A Framework for Partitioning Workloads Over Hybrid Clouds," 2 pages, The University of Texas at Dallas; University of California, Irvine; https://utd.edu/~vvk072000/Research/Hybridizer/tech-report.pdf on Jul. 9, 2015.

Christine Burns Rudalevige, "Hybrid Clouds Pose New Security Challenges," Feb. 11, 2013, 4 pages; retrieved from http://www.networkworld.com/article/2163059/cloud-computing/hybrid-clouds-pose-new-security-challanges.html on Jul. 9, 2015.

* cited by examiner

HYBRID SECURITY BATCH PROCESSING IN A CLOUD ENVIRONMENT

FIELD OF DISCLOSURE

The present disclosure generally relates to batch processing and more specifically to secure batch processing in a cloud environment.

BACKGROUND

Batch processing may refer to the processing of data without interaction or interruption. Once started, a batch process runs to some form of completion without any user intervention. Batch processing has challenges such as usability, which pertains to error handling and maintainability code. Another challenge in batch processing is scalability for a batch job because it is often one or more orders of magnitude larger than that of a typical web or thick-client application. Another challenge in batch processing is availability because batch jobs typically are not 24/7.

Batch processing can be made more efficient by the use of cloud computing to offload company servers or distribution of the computation. Both solutions, however, are risky from the security perspective. For example, with cloud computing, the organization exposes data to the cloud provider. Accordingly, the cloud provider may read this data and be privy to information that the organization considers confidential. Moreover, by distributing the computation, the data may be spread across different servers and possibly datacenters. The spread of the data across different servers and/or datacenters may pose many security concerns.

To achieve secured batch processing in the cloud environment, a conventional approach resorts to the so called "hybrid cloud." The hybrid cloud is a cloud solution that combines physical servers that are on premises of the organization with physical servers that are located in the cloud provider's datacenter. With this conventional approach, the sensitive computations are run only on physical servers on premise. While such a solution is very effective to achieve security, it lacks flexibility. For example, at certain points it may be the case that most computations use sensitive data to some extent. In this case, the on-premise servers may become overloaded and cloud resources underutilized, thus diminishing any value of having these resources at hand.

To achieve secured batch processing in a distributed environment, no effective techniques exist so far. For example, with the conventional approach discussed above, the nodes of the distributed cluster are typically placed behind a firewall of the organization's Intranet and carefully secured. Placing the nodes of the distributed cluster behind the organization's firewall may require the organization to task the best administrators to take care of each and every such server and promotes more homogeneity of the computing environment, which is simpler to manage.

BRIEF SUMMARY

Methods, systems, and techniques for processing a batch job that includes a plurality of sequentially ordered tasks are provided.

According to some embodiments, a method for processing a batch job that includes a plurality of sequentially ordered tasks includes obtaining a message that includes inputs of a plurality of tasks included in a batch job. The plurality of tasks includes a first task that is sequentially ordered before a second task. The method also includes assigning tasks of the plurality of tasks to different computing nodes. The first task is assigned to a first computing node associated with a first public key, and the second task is assigned to a second computing node associated with a second public key.

According to some embodiments, a system for processing a batch job that includes a plurality of sequentially ordered tasks includes a memory for storing a plurality of tasks included in a batch job. The plurality of tasks includes a first task that is sequentially ordered before a second task. The first task has a first set of inputs, and the second task has a second set of inputs. The system also includes a hybrid batch coordinator coupled to the memory. The hybrid batch coordinator obtains a message that includes inputs of the plurality of tasks and assigns tasks of the plurality of tasks to different computing nodes. The first task is assigned to a first computing node associated with a first public key, and the second task is assigned to a second computing node associated with a second public key. The system further includes an encryptor that encrypts a first set of inputs of the first task using the first public key and encrypts a second set of inputs of the second task using the second public key. At least one output generated by the first task is an input of the second set of inputs. The system also includes a dispatch module that dispatches the encrypted message to the first computing node. The encrypted message includes the encrypted first and second sets of inputs.

According to some embodiments, a machine-readable medium includes a plurality of machine-readable instructions that when executed by one or more processors is adapted to cause the one or more processors to perform a method including: obtaining a message that includes inputs of a plurality of tasks included in a batch job, where the plurality of tasks includes a first task that is sequentially ordered before a second task; assigning tasks of the plurality of tasks to different computing nodes, the first task being assigned to a first computing node associated with a first public key, and the second task being assigned to a second computing node associated with a second public key; encrypting a first set of inputs of the first task using the first public key; encrypting a second set of inputs of the second task using the second public key, at least one output generated by the first task being an input of the second set of inputs; and dispatching the encrypted message to the first computing node, where the encrypted message includes the encrypted first and second sets of inputs.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides possible solutions to security problems of processing a batch job in the cloud. According to some embodiments, a method for processing a batch job that includes a plurality of sequentially ordered tasks includes obtaining a message that includes inputs of a plurality of tasks included in a batch job. The plurality of tasks includes a first task that is sequentially ordered before a second task. The method also includes assigning tasks of the plurality of tasks to different computing nodes. The first task is assigned to a first computing node associated with a first public key, and the second task is assigned to a second computing node associated with a second public key.

The present disclosure provides techniques for processing a batch job that includes a plurality of sequentially ordered tasks. Unless specifically stated otherwise, as apparent from the following discussion, it is appreciated that throughout the description, discussions utilizing terms such as "obtaining," "generating," "assigning," "encrypting," "dispatching," "identifying," "distributing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
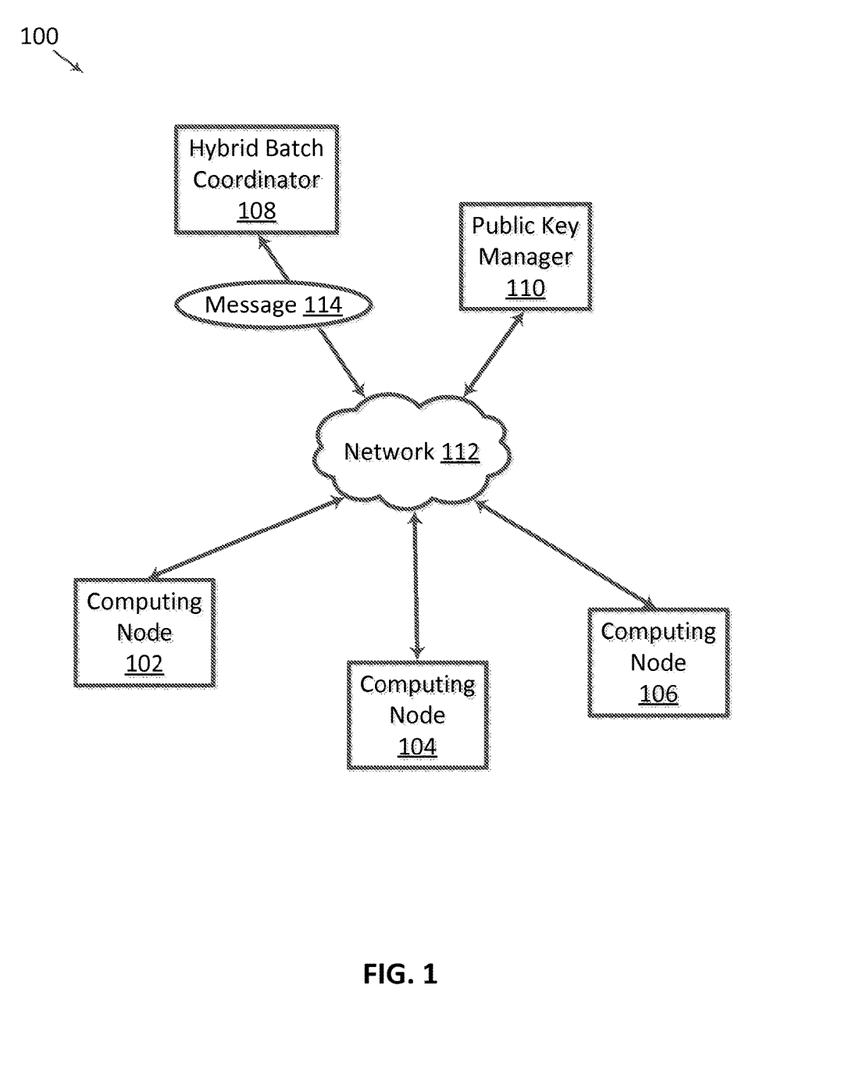
FIG. 1 is a block diagram illustrating a system for processing a batch job that includes a plurality of sequentially ordered tasks in accordance with some embodiments.

FIG. 1 is a block diagram illustrating a system 100 for processing a batch job that includes a plurality of sequentially ordered tasks in accordance with some embodiments. System 100 includes computing nodes 102, 104, and 106, hybrid batch coordinator 108, and public key manager 110 coupled over a network 112. Although three computing nodes, one hybrid batch coordinator 108, and one public key manager 110 are illustrated in FIG. 1, this is not intended to be limiting, and system 100 may include one or more computing nodes, hybrid batch coordinators, and/or public key managers.

Network 112 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Hybrid batch coordinator 108 may coordinate the processing of one or more batch jobs. A batch job may be abstracted into a series of tasks that are run sequentially. Each of the tasks may be assigned to a computing node, and the computing node may process its assigned task. As further discussed below, public key manager 110 may store public keys associated with the computing nodes. The public keys may be used to encrypt part of a message that is sent to a computing node. The components of system 100 may assist in processing a batch job in a more secured fashion and may identify possible weak points in the architecture from a security perspective. Hybrid batch coordinator 108 may send a message 114 to the first task in the batch job.

Figure 2:
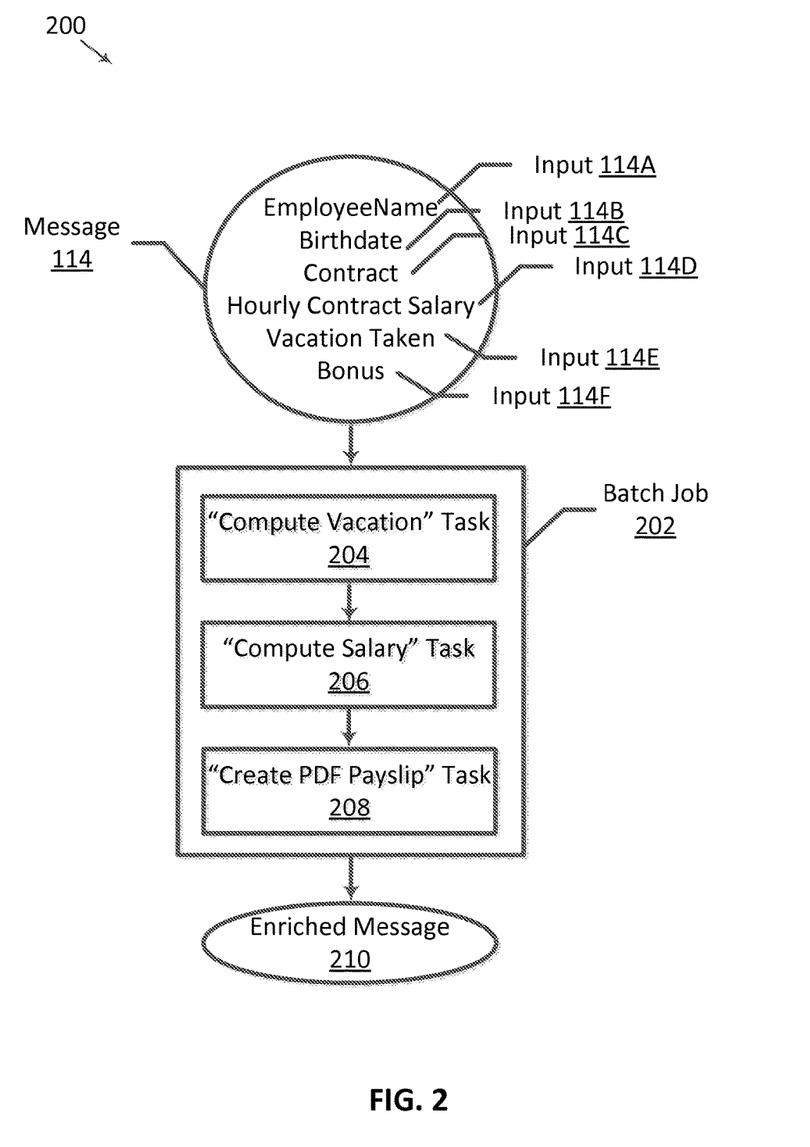
FIG. 2 illustrates an example batch job architecture in accordance with some embodiments.

FIG. 2 illustrates an example batch job architecture in accordance with some embodiments. Message 114 may be any data structure that is capable of storing inputs for a batch job. Message 114 includes six inputs, "EmployeeName" 114A, "Birthdate" 114B, "Contract" 114C, "Hourly Contract Salary" 114D, "Vacation Taken" input 114E, and "Bonus" 114F. In an example, it may be undesirable from an organization's perspective to disclose "Hourly Contract Salary" 114D to entities external to the organization.

Batch job 202 includes a plurality of sequentially ordered and discrete tasks. Batch job 202 may include any series of tasks that manipulates or extracts data from message 114. An example of a batch processing application is a payroll processing application or Extract Transform Load (ETL). The ETL aims to transform, clear, or process data, usually moving the data between data stores. In the example illustrated in FIG. 2, batch job 202 includes "Compute Vacation" task 204, "Compute Salary" task 206, and "Create PDF Payslip" task 208. "Compute Vacation" task 204 is sequentially ordered before "Compute Salary" task 206, which is sequentially ordered before "Create PDF Payslip" task 208 in batch job 202. Although batch job 202 includes three tasks, this is not intended to be limiting and batch job 202 may include two or more tasks.

Message 114 is processed sequentially by each task in a specific order. Message 114 may travel through each of the tasks in batch job 202 in accordance with the sequential order of the tasks. For example, message 114 may be processed first by "Compute Vacation" task 204, then by "Compute Salary" task 206, and lastly by "Create PDF Payslip" task 208. Each of the tasks may use some information in message 114 and enrich message 114 (add information to the message) for the next task, and the last task may generate enriched message 210. A task may use information that was generated by a previous task. Enriched message 210 may include the information that was originally in message 114 and some additional information.

Figure 3:
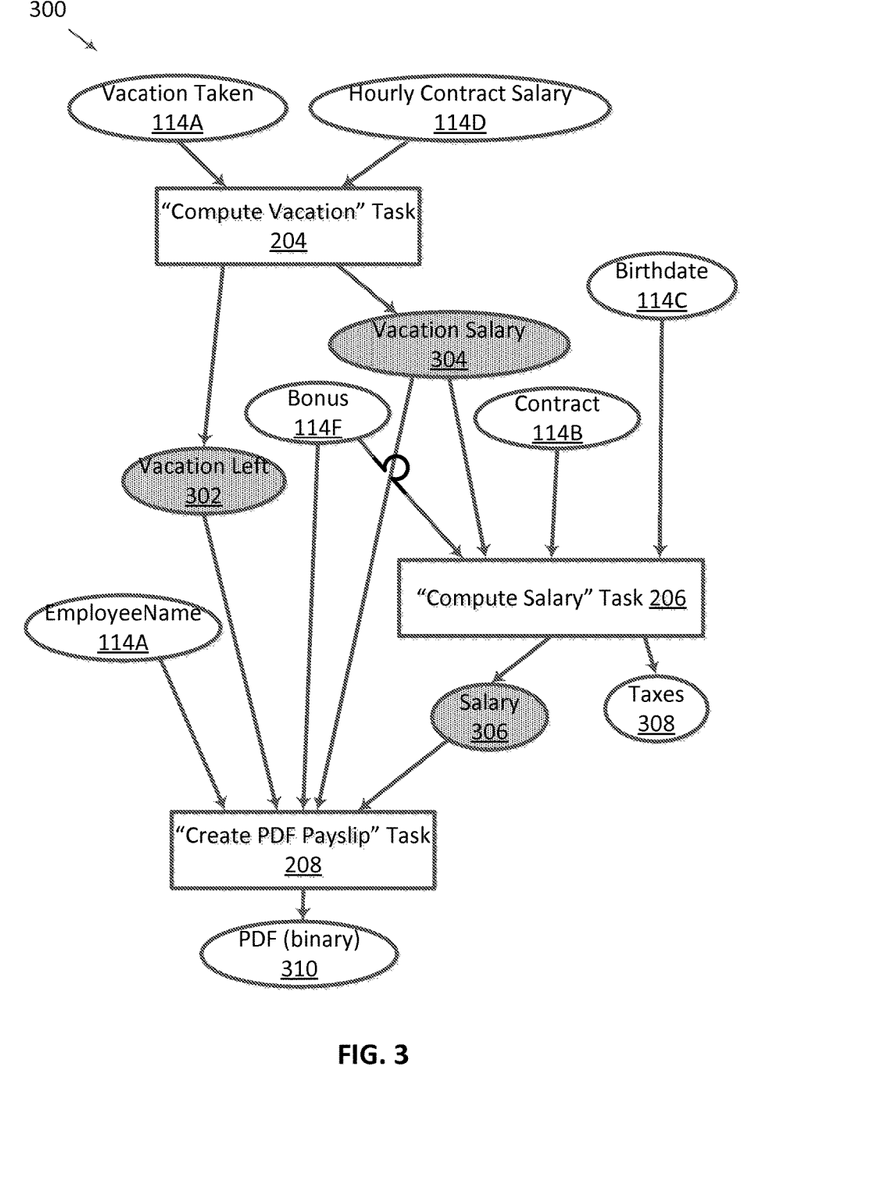
FIG. 3 illustrates example inputs and outputs for each of the tasks included in batch job in accordance with some embodiments.

FIG. 3 illustrates example inputs and outputs for each of the tasks included in batch job 202 in accordance with some embodiments. "Compute Vacation" task 204 has a first set of inputs including "Vacation Taken" 114A and "Hourly Contract Salary" 114D, and generates a first set of outputs including "Vacation Left" 302 and "Vacation Salary" 304. "Compute Vacation" task 204 actively uses the first set of inputs to generate the first set of outputs. A task actively uses an input if the task uses the input to perform some calculation for generating one or more outputs. In some examples, the first set of inputs is a complete set of inputs of "Compute Vacation" task 204.

"Compute Salary" task 206 has a second set of inputs including "Bonus" 114F, "Vacation Salary" 304, "Contract" 114B, and "Birthdate" 114C, and generates a second set of outputs including "Salary" 306 and "Taxes" 308. "Compute Salary" task 206 actively uses the second set of inputs to generate the second set of outputs. In some examples, the second set of inputs is a complete set of inputs of "Compute Salary" task 206.

"Create PDF Payslip" task 208 has a third set of inputs including "EmployeeName" 114A, "Vacation Left" 302, "Bonus" 114F, "Vacation Salary" 304, and "Salary" 306, and generates a third set of outputs including "PDF(binary)" 310. "Create PDF Payslip" task 208 actively uses the third set of inputs to generate the third set of outputs. In some examples, the third set of inputs is a complete set of inputs of "Create PDF Payslip" task 208. "PDF(binary)" 310 may be the end product of batch job 302. "Create PDF Payslip" task 208 may enrich message 114 by adding the binary PDF file to message 114.

One or more tasks may generate one or more outputs that is an input into another task in the batch job. These tasks are indicated as highlighted in FIG. 3. For example, "Compute Vacation" task 204 generates output "Vacation Salary" 304 that is used as an input into "Compute Salary" task 206 and "Create PDF Payslip" task 208. Additionally, "Compute Vacation" task 204 generates output "Vacation Left" 302 that is used as an input into "Create PDF Payslip" task 208. Similarly, "Compute Salary" task 206 generates output "Salary" 306 that is used as an input into "Create PDF Payslip" task 208.

Hybrid batch coordinator 108 may run the data processing of batch job 202 in a distributed fashion. For example, batch job 202 may be deployed on one or more computing nodes that run the batch job. A computing node may be a hardware processor. Each of the computing nodes may be on the same or different physical machines. An administrator may select which parts of the data processing may be run inside the organization and which should be outsourced into a cloud.

Figure 4A:
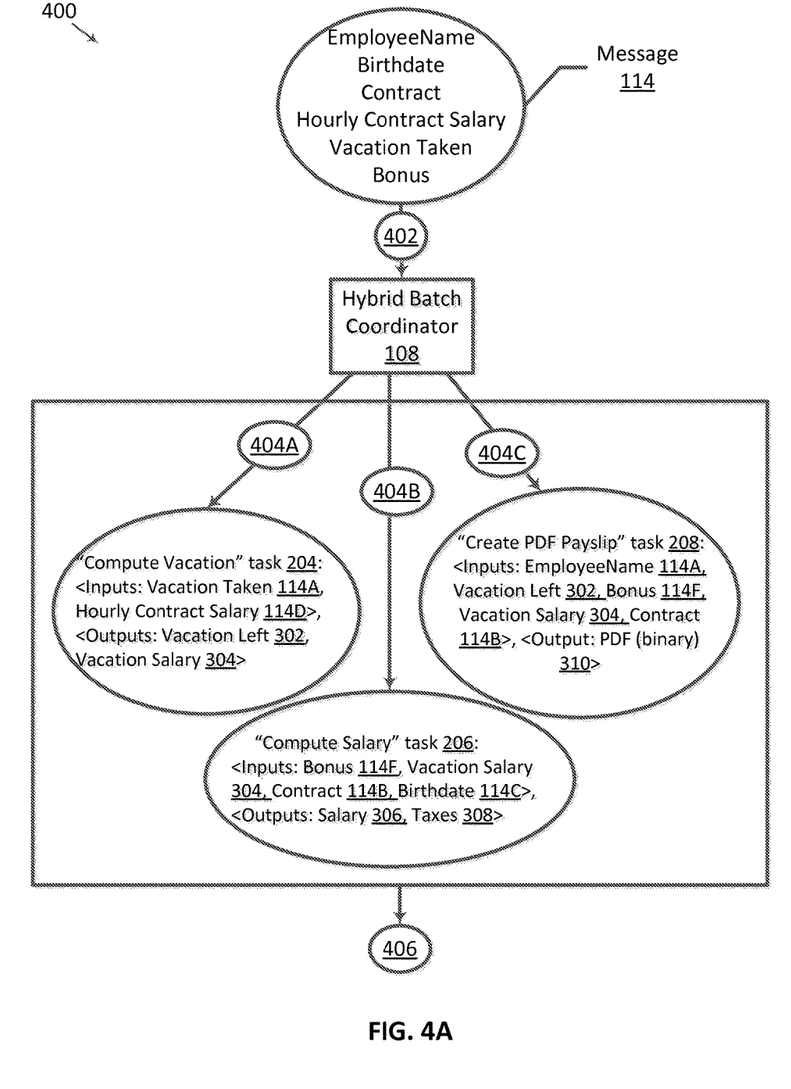
FIGS. 4A-4C illustrate an example process flow for processing a batch job in accordance with some embodiments.
Figure 4B:
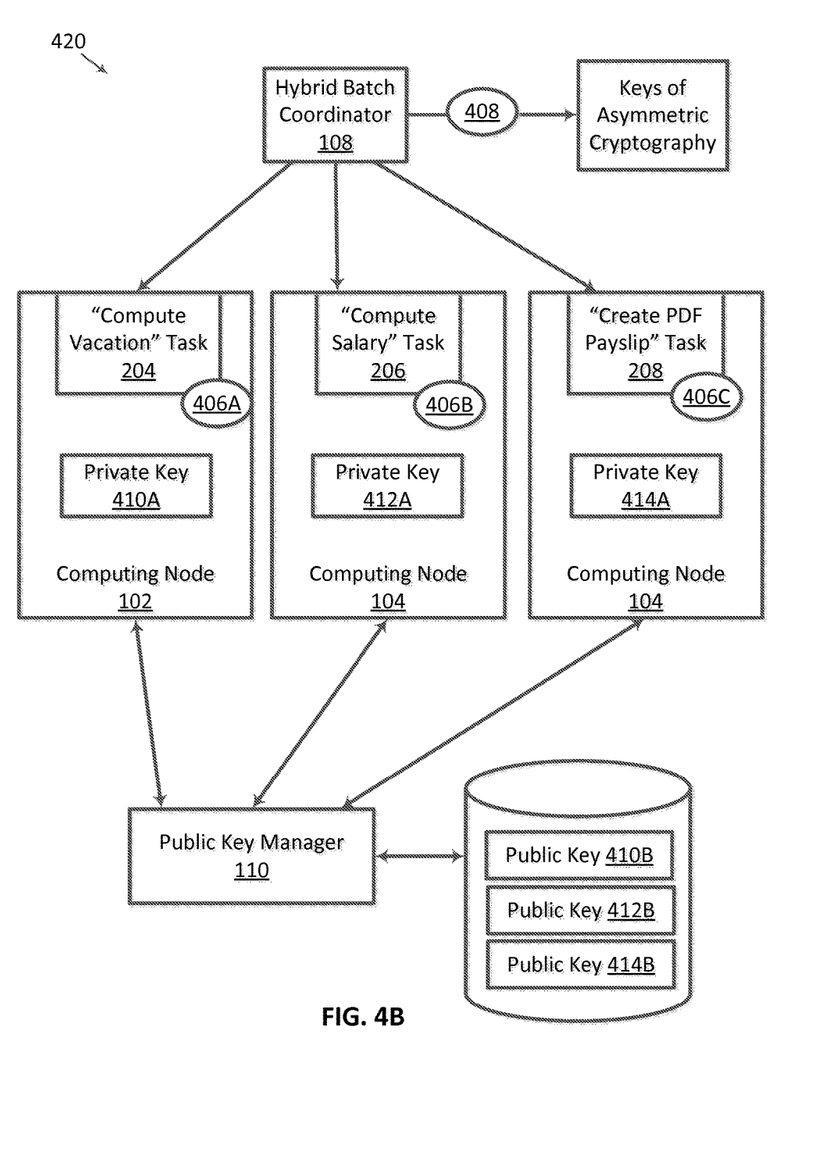
Figure 4C:
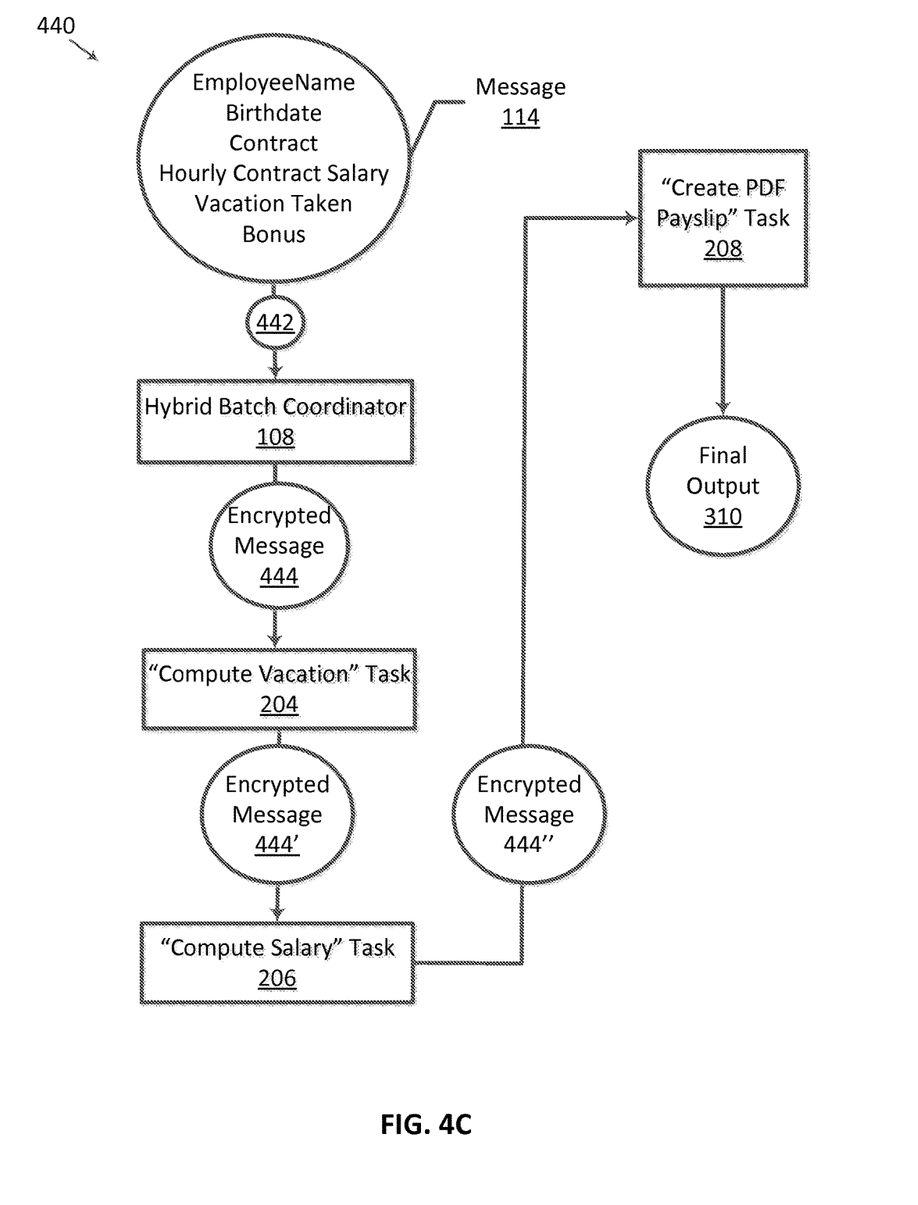

FIGS. 4A-4C illustrate an example process flow 400, 420, 440 for processing batch job 202 in accordance with some embodiments. In FIG. 4A, at an action 402, hybrid batch coordinator 108 obtains message 114, which includes inputs of "Compute Vacation" task 204, "Compute Salary" task 206, and "Create PDF Payslip" task 208 in batch job 202.

At an action 404, hybrid batch coordinator 108 identifies inputs and outputs of the plurality of tasks included in batch job 202. Hybrid batch coordinator 108 may analyze each task with regards to which parts of message 114 the respective task uses. Each of "Compute Vacation" task 204, "Compute Salary" task 206, and "Create PDF Payslip" task 208 uses a subset of the inputs included in message 114. In some examples, hybrid batch coordinator 108 uses static code analysis to determine which parts of message 114 are read and written to by a task. In an example, hybrid batch coordinator 108 may use JBOSS® ENTERPRISE SERVICE BUS® (ESB), JAVA® based software, to perform the static code analysis.

At an action 404A, hybrid batch coordinator 108 identifies inputs "Vacation Taken" 114A and "Hourly Contract Salary" 114D of "Compute Vacation" task 204, and outputs "Vacation Left" 302 and "Vacation Salary" 304 generated by the task. At an action 404B, hybrid batch coordinator 108 identifies inputs "Bonus" 114F, "Vacation Salary" 304, "Contract" 114B, and "Birthdate" 114C of "Compute Salary" task 206, and outputs "Salary" 306 and "Taxes" 308 generated by the task. At an action 404C, hybrid batch coordinator 108 identifies inputs "EmployeeName" 114A, "Vacation Left" 302, "Bonus" 114F, "Vacation Salary" 304, and "Salary" 306, and output "PDF(binary)" 310 generated by the task. Additionally, any enrichment to the message may also be analyzed.

Referring now to FIG. 4B, at an action 406, hybrid batch coordinator 108 assigns tasks of the plurality of tasks to different computing nodes. In some examples, computing node 102 is part of an internal infrastructure of an entity, and computing node 104 is a third-party cloud service provider that is different from the entity. At an action 408, hybrid batch coordinator 108 distributes keys of asymmetric cryptography among the computing nodes. Hybrid batch coordinator 108 may obtain different asymmetric-cryptographic key pairs for different computing nodes. Each asymmetric-cryptographic key pair includes a private key and a public key that are specific to the respective computing node.

In an example, hybrid batch coordinator 108 generates the asymmetric cryptography keys. In another example, hybrid batch coordinator 108 obtains the asymmetric cryptography keys from another entity. A first asymmetric cryptography key pair includes a private key 410A and a matching public key 410B, a second asymmetric cryptography key pair includes a private key 412A and a matching public key 412B, and a third asymmetric cryptography key pair includes a private key 414A and a matching public key 414B. Hybrid batch coordinator 108 may distribute the public keys to public key manager 110 and distribute the private keys to the computing nodes. Public key manager 110 stores the public part of the asymmetric cryptography key pair of each computing node, and each computing node possesses the private key part of the appropriate asymmetric cryptography key pair.

In the example illustrated in FIG. 4B, "Compute Vacation" task 204 is assigned to computing node 102, which is associated with private key 410A and public key 410B, "Compute Salary" task 206 is assigned to computing node 104, which is associated with private key 412A and public key 412B, and "Create PDF Payslip" task 208 is assigned to computing node 106, which is associated with private key 414A and public key 414B. In some examples, computing node 102 runs one instance of the batch processing technology that is deployed in the organization. In an example, the only extensions that are used are those related to cryptography.

Referring now to FIG. 4C, at an action 442, hybrid batch coordinator 108 may identify the plurality of tasks in batch job 202 and for each task, encrypt each set of inputs of the respective task using its associated public key. Hybrid batch coordinator 108 may inspect the active input and output records and encrypt the inputs included in message 114 by public keys 410B, 412B, and/or 414B associated with computing nodes 102, 104, and 106. In an example, a part "X" of message 114 is encrypted by the matching public key "Y" if and only if the computing node "Y" needs part "X" for computation. In this way, only computing node "Y" can read part "X" of the message.

For example, hybrid batch coordinator 108 encrypts a first set of inputs of "Compute Vacation" task 204 using public key 410A, encrypts a second set of inputs of "Compute Salary" task 206 using public key 412A, and encrypts a third set of inputs of "Create PDF Payslip" task 208 using public key 414A. Hybrid batch coordinator 108 may generate an encrypted message 444 having the first, second, and third aforementioned sets of inputs encrypted using different public keys. At least one output generated by "Compute Vacation" task 204 is an input of "Compute Salary" task 206. A task that generates an output that is used as an input of another task may encrypt that output using the other task's public key.

More copies of each computing node (or processor) may be part of system 100, and the messages may be load balanced between them. Encrypted message 444 is processed by the plurality of tasks in accordance with the sequential task order. Hybrid batch coordinator 108 initiates the running of the batch application on computing nodes 102, 104, and/or 106 by dispatching encrypted message 444 as discussed in more detail below.

The techniques of the present disclosure ensure security of information. A computing node may encrypt and decrypt parts of a message. Hybrid batch coordinator 108 dispatches encrypted message 444 to computing node 102, the computing node to which the first ordered task in batch job 202 is assigned. Computing node 102 receives encrypted message 444 and decrypts some parts of encrypted message 444, and the decrypted parts are exactly the inputs "Compute Vacation" task 204 needs for generating output. In an example, computing node 102 receives encrypted message 444, which includes the first set of inputs of "Compute Vacation" task 204 encrypted with public key 410A. Computing node 102 decrypts this first set of inputs using private key 410B, and generates the first set of outputs including "Vacation Left" 302 and "Vacation Salary" 304 (see FIG. 3).

Computing node 102 may encrypt "Vacation Left" 302 and "Vacation Salary" 304 using public key 414B (associated with computing node 106 and "Create PDF Payslip" task 208), and encrypt "Vacation Salary" 304 using public key 412B (associated with computing node 104 and "Compute Salary" task 206). A computing node (e.g., computing node 102) may mark each of these inputs such that the appropriate computing node knows which inputs to decrypt. Accordingly, only those computing nodes that need this information can access them. Computing node 102 may enrich encrypted message 444 with the aforementioned encrypted "Vacation Left" 302 and "Vacation Salary" 304 inputs to generate an enriched encrypted message 444', and may send enriched encrypted message 444' to computing node 104.

Computing node 104 receives enriched encrypted message 444' and decrypts some parts of enriched encrypted message 444', and the decrypted parts are exactly the inputs "Compute Salary" task 206 needs for generating output. In an example, computing node 104 receives enriched encrypted message 444', which includes the second set of inputs of "Compute Salary" task 206 encrypted with public key 412A. Computing node 104 decrypts this second set of inputs using private key 412B, and generates the second set of outputs including "Salary" 306 and "Taxes" 308. Computing node 104 may identify "Salary" 306 as being in put into "Create PDF Payslip" task 208, encrypt "Salary" 306 using public key 414B (associated with computing node 106 and "Create PDF Payslip" task 208), and enrich encrypted message 444' with the aforementioned encrypted "Salary" 306 input.

Computing node 106 receives enriched encrypted message 444" and decrypts some parts of enriched encrypted message 444", and the decrypted parts are exactly the inputs "Create PDF Payslip" task 208 needs for generating output. In an example, computing node 106 receives enriched encrypted message 444", which includes the third set of inputs of "Create PDF Payslip" task 208 encrypted with public key 414A. Computing node 106 decrypts this third set of inputs using private key 414B and generates a final output 310. In some examples, computing node 106 may be inside the organization and may enrich encrypted message 444" with "PDF(binary)" 310, which may be sent to a computing device. In some examples, "PDF(binary)" 310 may be a PDF payslip that is distributed to the employees of the organization.

An advantage of an embodiment of the disclosure may provide for data that is hidden during the processing of a task and exposed only when really necessary (used to generate an output). An administrator may choose to run some computing nodes on premise of their organization or to outsource them to the cloud. In this way, security may be set up automatically from the original batch job definition. Additionally, many organizations already use some software that produces batch job definitions. Accordingly, an embodiment of the disclosure may be a very appealing option for these organizations.

III. Example Method

Figure 5:
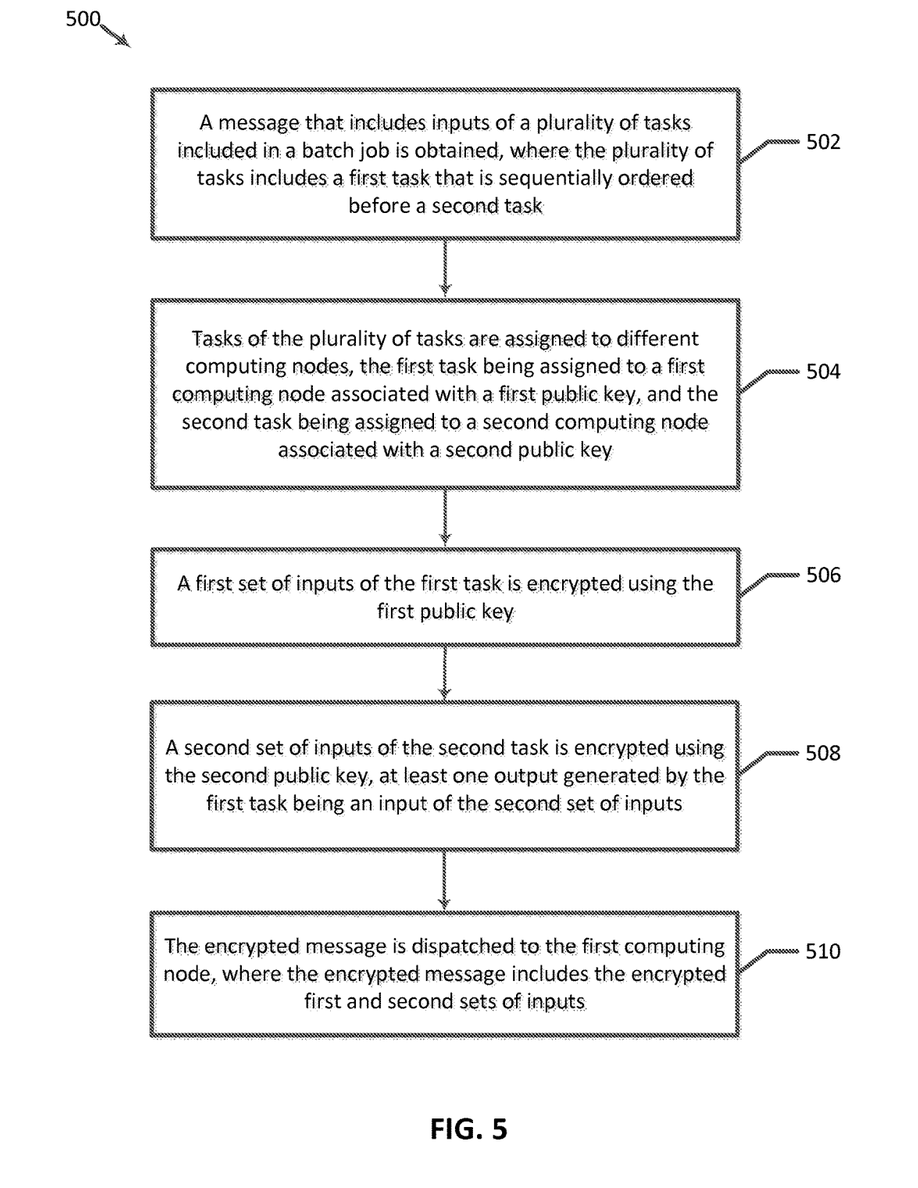
FIG. 5 is a flowchart illustrating a method for processing a batch job that includes a plurality of sequentially ordered tasks in accordance with some embodiments.

FIG. 5 is a flowchart illustrating a method 500 for processing a batch job that includes a plurality of sequentially ordered tasks in accordance with some embodiments. Method 500 is not meant to be limiting and may be used in other applications.

In FIG. 5, method 500 includes blocks 502-510. In a block 502, a message that includes inputs of a plurality of tasks included in a batch job is obtained, where the plurality of tasks includes a first task that is sequentially ordered before a second task. In an example, hybrid batch coordinator 108 obtains message 114 that includes inputs of tasks 204, 206, and 208 included in batch job 202, where the plurality of tasks includes "Compute Vacation" task 204 that is sequentially ordered before "Compute Salary" task 206, which is sequentially ordered before "Create PDF Payslip" task 208.

In a block 504, tasks of the plurality of tasks are assigned to different computing nodes, the first task being assigned to a first computing node associated with a first public key, and the second task being assigned to a second computing node associated with a second public key. In an example, hybrid batch coordinator 108 assigns tasks of the plurality of tasks to different computing nodes, where "Compute Vacation" task 204 is assigned to computing node 102 associated with public key 410B, and "Compute Salary" task 206 is assigned to computing node 104 associated with public key 412B.

In a block 506, a first set of inputs of the first task is encrypted using the first public key. In an example, hybrid batch coordinator 108 encrypts "Vacation Taken" 114A and "Hourly Contract Salary" 114D of "Compute Vacation" task 204 using public key 410B. In a block 508, a second set of inputs of the second task is encrypted using the second public key, at least one output generated by the first task being an input of the second set of inputs. In an example, hybrid batch coordinator 108 encrypts "Bonus" 114F, "Vacation Salary" 304, "Contract" 114B, and "Birthdate" 114C of "Compute Salary" task 206 using public key 412B, where "Vacation Salary" 304 is generated by "Compute Vacation" task 204 and is an input of "Compute Salary" task 206. In a block 510, the encrypted message is dispatched to the first computing node, where the encrypted message includes the encrypted first and second sets of inputs. In an example, hybrid batch coordinator 108 dispatches encrypted message 444 to computing node 102, where encrypted message 444 includes the encrypted first and second sets of inputs.

In some embodiments, one or more actions illustrated in blocks 502-510 may be performed for any number of batch jobs. Additionally, it is also understood that additional processes may be inserted before, during, or after blocks 502-510 discussed above. It is also understood that one or more of the blocks of method 500 described herein may be omitted, combined, or performed in a different sequence as desired.

As discussed above and further emphasized here, FIGS. 1-3, 4A-4C, and 5 are merely examples, which should not unduly limit the scope of the claims. For example, it should be understood that hybrid batch coordinator 108 and public key manager 110 may reside on the same or different computing devices. Additionally, each of computing nodes 102, 104, and/or 106 may be processors residing on the same machine as each other or different machines. Moreover, tasks may be decomposed into more tasks that need only parts of the message. In one way or another, it is beneficial to know which parts of the batch job need more security.

IV. Example Computing System

Figure 6:
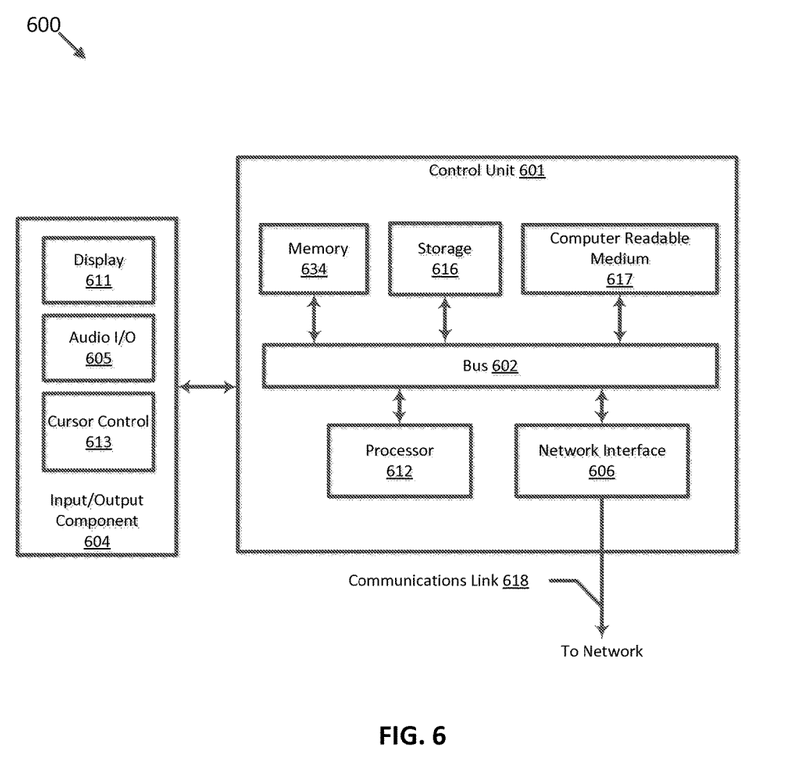
FIG. 6 is a block diagram of an electronic system suitable for implementing one or more embodiments of the present disclosure.

FIG. 6 is a block diagram of a computer system 600 suitable for implementing one or more embodiments of the present disclosure. Each of hybrid batch coordinator 108, public key manager 110, and computing nodes 102, 104, and 106 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the application server using a computer network (not shown). The computer network may be any type of network including a LAN, a WAN, an Intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. A processor 612, which may be a micro-controller, digital signal processor (DSP), or other processing component, processes these various signals, such as for display on computer system 600 or transmission to other devices via communications link 608. Components of computer system 600 also include a system memory component 634 (e.g., RAM), a static storage component 616 (e.g., ROM), and/or a disk drive 617. Computer system 600 performs specific operations by processor 612 and other components by executing one or more sequences of instructions contained in system memory component 634.

Components include an input/output (I/O) component 604 that processes a user action, such as selecting keys from a keypad/keyboard, selecting one or more buttons or links, etc., and sends a corresponding signal to bus 602. I/O component 404 may include an output component such as a display 611, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 608 to a network. In an embodiment, the transmission is wireless, although other transmission mediums and methods may also be suitable.

Logic may be encoded in a computer readable medium 617, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 500) to practice the present disclosure may be performed by computer system 600. In various other embodiments of the present disclosure, a plurality of computer systems 600 coupled by communications link 608 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method for processing a batch job that includes a plurality of sequentially ordered tasks, comprising:
    obtaining a message that includes inputs of a plurality of tasks included in a batch job, wherein the plurality of tasks includes a first task that is sequentially ordered before a second task;
    assigning tasks of the plurality of tasks to different computing nodes, the first task being assigned to a first computing node associated with a first public key, and the second task being assigned to a second computing node associated with a second public key different from the first public key;
    encrypting a first set of inputs of the first task using the first public key;
    encrypting a second set of inputs of the second task using the second public key;
    dispatching an encrypted message to the first computing node, wherein the encrypted message includes the encrypted first and second sets of inputs;
    generating, at the first computing node, an output that is an input into the second task;
    encrypting, at the first computing node, the output using the second public key;
    enriching the encrypted message with the encrypted output; and
    sending the enriched message to the second computing node.

2. The method of claim 1, comprising:
    identifying the input(s) of each task of the plurality of tasks.

3. The method of claim 1, wherein the first public key and a first private key are part of a first asymmetric-cryptography key pair associated with the first computing node, and the second public key and a second private key are part of a second asymmetric-cryptography key pair associated with the second computing node.

4. The method of claim 1, comprising:
    distributing the first and second public keys to a public key manager.

5. The method of claim 3, comprising:
    distributing the first private key to the first computing node; and
    distributing the second private key to the second computing node.

6. The method of claim 1, comprising:
    obtaining different asymmetric-cryptographic key pairs for the different computing nodes, each asymmetric-cryptographic key pair including a private key and a public key that are specific to the respective computing node.

7. The method of claim 1, wherein the encrypted message is processed by the plurality of tasks in accordance with the sequential order.

8. The method of claim 1, wherein the first task actively uses the first set of inputs to generate a first set of outputs, and wherein the second task actively uses the second set of inputs and the output to generate a second set of outputs.

9. The method of claim 8, wherein the first set of inputs is a complete set of inputs of the first task, and the second set of inputs and the output are a complete set of inputs of the second task.

10. The method of claim 1, wherein the first computing node is part of an internal infrastructure of an entity, and the second computing node is a third-party cloud service provider that is different from the entity.

11. A system for processing a batch job that includes a plurality of sequentially ordered tasks, comprising:
    a memory for storing a plurality of tasks included in a batch job, wherein the plurality of tasks includes a first task that is sequentially ordered before a second task, the first task has a first set of inputs, and the second task has a second set of inputs;
    a hybrid batch coordinator coupled to the memory, wherein the hybrid batch coordinator obtains a message that includes inputs of the plurality of tasks, assigns the first task to a first computing node associated with a first public key, and assigns the second task to a second computing node associated with a second public key;
    an encryptor that encrypts a first set of inputs of the first task using the first public key and encrypts a second set of inputs of the second task using the second public key; and
    a network interface that dispatches an encrypted message to the first computing node, wherein the encrypted message includes the encrypted first and second sets of inputs,
    wherein the first computing node generates an output that is an input into the second task, encrypts the output using the second public key, enriches the encrypted message with the encrypted output, and sends the enriched message to the second computing node.

12. The system of claim 11, wherein the first computing node is part of an internal infrastructure of an entity, and the second computing node is a third-party cloud service provider that is different from the entity.

13. The system of claim 11, wherein the first public key and a first private key are part of a first asymmetric-cryptography key pair associated with the first computing node.

14. The system of claim 13, wherein the first computing node decrypts the encrypted first set of inputs using the first private key.

15. The system of claim 14, wherein the first computing node is unable to decrypt the encrypted second set of inputs.

16. The system of claim 14, wherein the first task actively uses the first set of inputs to generate the first set of outputs.

17. The system of claim 11, wherein the first computing node enriches the encrypted message by placing the encrypted output into the encrypted message.

18. The system of claim 11, wherein the second public key and a second private key are part of a second asymmetric-cryptography key pair associated with the second computing node, and wherein the second computing node decrypts the encrypted second set of inputs and the encrypted output included in the enriched message using the second private key, and the second task actively uses the second set of inputs and the output to generate a second set of outputs.

19. A non-transitory machine-readable medium comprising a plurality of machine-readable instructions that when executed by one or more processors is adapted to cause the one or more processors to perform a method comprising:
    obtaining a message that includes inputs of a plurality of tasks included in a batch job, wherein the plurality of tasks includes a first task that is sequentially ordered before a second task;
    assigning tasks of the plurality of tasks to different computing nodes, the first task being assigned to a first computing node associated with a first public key, and the second task being assigned to a second computing node associated with a second public key different from the first public key;

encrypting a first set of inputs of the first task using the first public key;

encrypting a second set of inputs of the second task using the second public key;

dispatching an encrypted message to the first computing node, wherein the encrypted message includes the encrypted first and second sets of inputs;

generating, at the first computing node, an output that is an input into the second task;

encrypting, at the first computing node, the output using the second public key;

enriching the encrypted message with the encrypted output; and sending the enriched message to the second computing node.

20. The machine-readable medium of claim 19, wherein the first computing node enriches the encrypted message by placing the encrypted output into the encrypted message.

* * * * *